(12) United States Patent
Hong

(10) Patent No.: US 8,581,872 B2
(45) Date of Patent: Nov. 12, 2013

(54) METHOD AND APPARATUS FOR FINDING LOCAL MAXIMA IN A TWO-DIMENSIONAL ARRAY

(75) Inventor: Soh Kok Hong, Singapore (SG)

(73) Assignee: Silicon Laboratories Inc., Austin, TX (US)

( * ) Notice: Subject to any disclaimer, the term of this patent is extended or adjusted under 35 U.S.C. 154(b) by 130 days.

(21) Appl. No.: 13/342,790

(22) Filed: Jan. 3, 2012

(65) Prior Publication Data

US 2013/0169547 A1    Jul. 4, 2013

(51) Int. Cl.
*G06F 3/041*    (2006.01)

(52) U.S. Cl.
USPC .......................................... 345/173; 708/207

(58) Field of Classification Search
USPC .................................. 345/173–174; 708/207
See application file for complete search history.

(56) References Cited

U.S. PATENT DOCUMENTS

| | | | |
|---|---|---|---|
| 5,003,618 A * | 3/1991 | Meno | 382/261 |
| 2006/0279551 A1 * | 12/2006 | Lii et al. | 345/173 |
| 2007/0285404 A1 * | 12/2007 | Rimon et al. | 345/173 |
| 2010/0172554 A1 * | 7/2010 | Kassab et al. | 382/128 |

FOREIGN PATENT DOCUMENTS

WO    WO2005109181    * 11/2005    ............... G06F 7/02

* cited by examiner

*Primary Examiner* — William Boddie
*Assistant Examiner* — Bipin Gyawali
(74) *Attorney, Agent, or Firm* — Meyertons, Hood, Kivlin, Kowert & Goetzel, P.C.; Stephen J. Curran

(57) ABSTRACT

A method for finding local maxima in a two-dimensional array includes generating a row array for each row in the array and a column array for each column in the array. The values in a given generated row array are indicative of local maxima of values in the corresponding row, and values in a given generated column array are indicative of local maxima of values in the corresponding column. The method may also include the computer multiplying values in the generated row and column arrays to determine local maxima of the array.

20 Claims, 8 Drawing Sheets

Touch Strength Values

| 0 | 161 | 283 | 112 | 0 | 0 | 0 | 0 |
|---|---|---|---|---|---|---|---|
| 103 | 469 | 513 | 413 | 0 | 0 | 0 | 0 |
| 96 | 428 | 509 | 419 | 49 | 0 | 0 | 0 |
| 47 | 105 | 150 | 93 | 0 | 0 | 0 | 0 |
| 0 | 0 | 0 | 66 | 147 | 72 | 0 | 0 |
| 0 | 0 | 0 | 394 | 520 | 383 | 53 | 0 |
| 0 | 0 | 52 | 393 | 520 | 425 | 53 | 0 |
| 0 | 0 | 0 | 117 | 188 | 109 | 0 | 0 |
| 0 | 0 | 0 | 0 | 0 | 0 | 0 | 0 |

+1

Incremented Touch Strength Values

| 0 | 162 | 284 | 113 | 0 | 0 | 0 | 0 |
|---|---|---|---|---|---|---|---|
| 104 | 470 | 514 | 414 | 0 | 0 | 0 | 0 |
| 97 | 429 | 510 | 420 | 50 | 0 | 0 | 0 |
| 48 | 106 | 151 | 94 | 0 | 0 | 0 | 0 |
| 0 | 0 | 0 | 67 | 148 | 73 | 0 | 0 |
| 0 | 0 | 0 | 395 | 521 | 384 | 54 | 0 |
| 0 | 0 | 53 | 394 | 521 | 426 | 54 | 0 |
| 0 | 0 | 0 | 118 | 189 | 110 | 0 | 0 |
| 0 | 0 | 0 | 0 | 0 | 0 | 0 | 0 |

METHOD AND APPARATUS FOR FINDING LOCAL MAXIMA IN A TWO-DIMENSIONAL ARRAY

BACKGROUND

1. Technical Field

This disclosure relates to arrays, and more particularly to array calculations to find local maxima.

2. Description of the Related Art

More than ever, touchscreens have become commonplace as a user interface and input mechanism for many types of electronics devices. Many such devices are portable devices, and have embedded processors or microcontrollers to support the touchscreen and other input/output services.

A typical touchscreen may generate a set of two-dimensional sensor readings that firmware interprets to determine the locations of the largest sensor reading (or local maxima) compared to the nearest neighbor nodes. Determining this in a low cost 8-bit microcontroller can be challenging due to the amount of processing that is required. One conventional technique to find the local maxima involves performing comparisons of every touch strength value with as many as eight neighboring nodes. The processing can take a long time for a slow microcontroller. Further complicating the problem are the situations such as additional fingers touching the panel, or when neighbor nodes at the local maxima have the same sensor value ("plateau"), for example.

SUMMARY OF THE EMBODIMENTS

Various embodiments of a method and apparatus for finding local maxima in a two-dimensional array are disclosed. Broadly speaking a method and apparatus for finding local maxima in a two-dimensional array are contemplated. More particularly, the method and apparatus may find the values in the array in which the gradient function is equal to zero in both dimensions of the two-dimensional array. Thus, the method may include generating both row and column arrays the values of which are indicative of local maxima of values in the corresponding rows and columns, respectively. The row and column arrays are multiplied together to form a final array the values of which indicate which values in the two-dimensional array are local maxima.

In one embodiment, a method may include a computer generating a row array for each row in the array and a column array for each column in the array. The values in a given generated row array are indicative of local maxima of values in the corresponding row, and values in a given generated column array are indicative of local maxima of values in the corresponding column. The method may also include the computer multiplying values in the generated row and column arrays to determine local maxima of the array.

In another embodiment, an apparatus includes a storage configured to store an array of values, and a processor coupled to the storage. The processor includes a multiplier accumulator unit configured to operate on the values in the storage. The multiplier accumulator unit may be configured to generate a row array for each row in the array and a column array for each column in the array. The values in a generated row array may be indicative of local maxima of values in the corresponding row, and values in a generated column array may be indicative of local maxima of values in the corresponding column. The multiplier accumulator unit may also be configured to multiply values in the generated row and column arrays to determine local maxima of the array.

In yet another embodiment, a method includes a computer determining a positive row gradient array and a negative row gradient array for values in each row in a two-dimensional array of values based upon a difference between the values in each row and an incremented version of the values in the two-dimensional array of values. The method may also include the computer generating a row array for each row in the two-dimensional array of values based upon the positive gradient array and the negative gradient array. The values in a given row array may be indicative of local maxima of values in the corresponding row. The method may also include the computer determining a positive column gradient array and a negative column gradient array for values in each column in the two-dimensional array of values based upon a difference between the values in each column and an incremented version of the values in the two-dimensional array of values. The method may further include the computer generating a column array for each column in the two-dimensional array of values. The values in a given column array may be indicative of local maxima of values in the corresponding column. Lastly, the row array and the column array may be used to determine local maxima in the two-dimensional array of values. A local maximum corresponds to a value in which a gradient function is equal to zero in both dimensions of the two-dimensional array of values.

Figure 1:
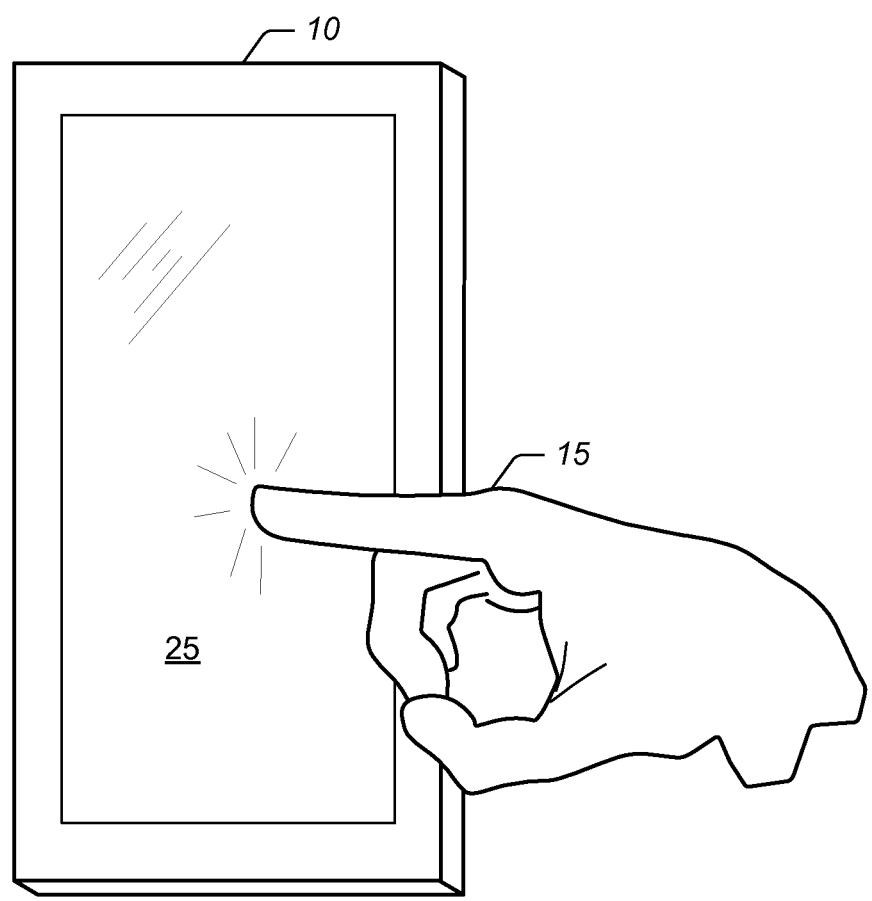
FIG. 1 is a diagram of a user operating an exemplary portable device with a touchscreen.

Specific embodiments are shown by way of example in the drawings and will herein be described in detail. It should be understood, however, that the drawings and detailed description are not intended to limit the claims to the particular embodiments disclosed, even where only a single embodiment is described with respect to a particular feature. On the contrary, the intention is to cover all modifications, equivalents and alternatives that would be apparent to a person skilled in the art having the benefit of this disclosure. Examples of features provided in the disclosure are intended to be illustrative rather than restrictive unless stated otherwise.

As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

As mentioned above, touchscreens have become commonplace in electronic devices. As shown in the diagram of FIG. 1 a user is operating an exemplary device 10 with a touchscreen 25. In one embodiment, the touchscreen 25 may be the primary input source to the device 10. As shown a person's index finger 15 is touching the screen to select or point to something on the screen of the device 10. It is noted that the device 10 may be representative of any type of device having a touchscreen. For example, device 10 may be representative of any of a variety of portable devices such as a mobile phone, digital music player, bar code scanner, camera, and the like.

Accordingly, to keep costs down, inexpensive processors or microcontrollers may sometimes be used to interpret the sensor readings received from the touchscreen 25. In many cases, these inexpensive microcontrollers may include a multiplier/accumulator unit that can perform basic arithmetic and logical functions at high speed. Accordingly, such a processing system may be included within a device such as device 10. An exemplary system that includes such a processor/microcontroller is shown in FIG. 4.

In one embodiment, the touchscreen 25 may include a number of sensor nodes that comprise physical transducers. In a capacitive touchscreen, for example, the transducers may convert a change in capacitance (such as that caused by an object coming into close proximity with or touching the touchscreen) to a change in voltage, and provide the change in voltage (ΔV) as a touch strength value to firmware, or another processing mechanism within a such as device 10. More particularly, in one embodiment the touchscreen 25 may be arranged as a two-dimensional array of sensor nodes, and each sensor node may provide a corresponding touch strength value to the firmware. It is noted that the firmware may correspond to program software instructions or dedicated hardware, or a combination of both that are within a processing mechanism such as a processor or a microcontroller.

Figure 4:
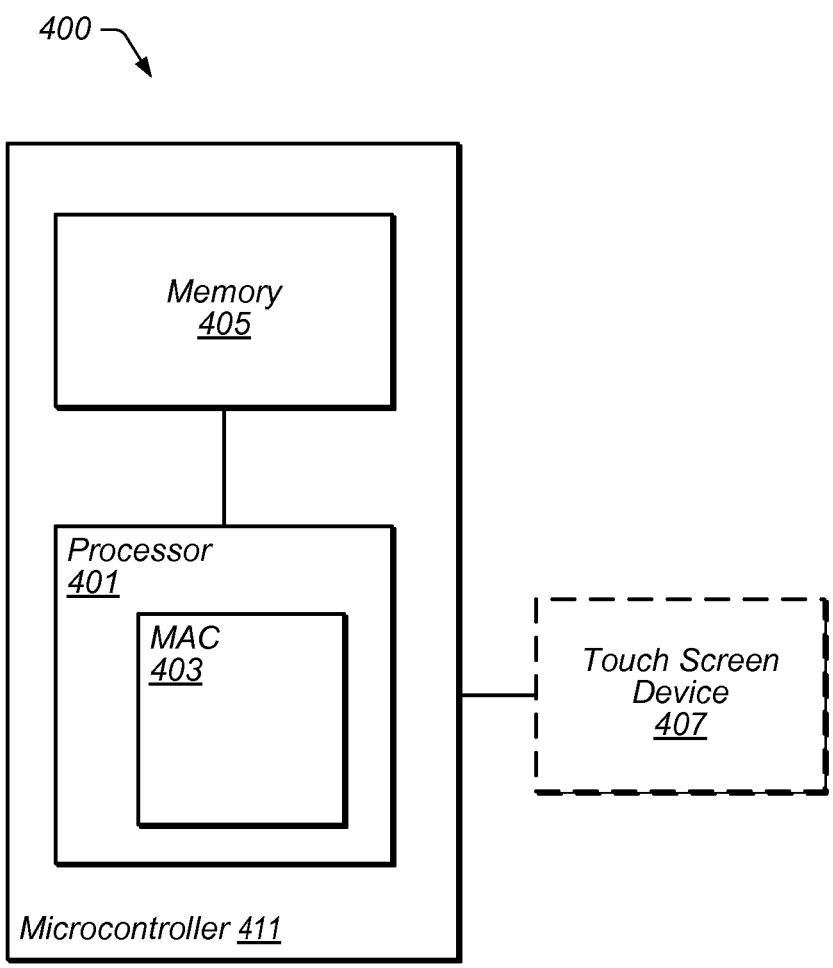
FIG. 4 is a block diagram of one embodiment of a system.

Referring briefly to FIG. 4, a block diagram of one embodiment of a system is shown. In one embodiment, the system 400 includes a microcontroller 411 coupled to a touchscreen 407. The microcontroller 411 includes a processor 401, which includes a multiplier accumulator (MAC) 403. The processor 401 is coupled to a memory 405. In an alternative embodiment, the processor 401 and the memory 405 may be stand alone devices, and not embedded within or part of a microcontroller.

The processor 401 may be configured to execute program instructions stored with the memory 405. In one embodiment, the memory 405 may be an embedded memory used to store program code or firmware.

It is noted that although the algorithm used to find the local maxima of the two-dimensional array was described in the context of touchscreen values, it is contemplated that the same flow may be used to find the local maxima of any two-dimensional array of values regardless of the source of the values in the array. Accordingly, the touchscreen 407 is shown in dotted lines. Thus, in an alternative embodiment, the array of values may come from a different source, and there may be no touchscreen 407 in system 400.

As described further below, the firmware may create a two-dimensional array of the received touch strength values. It is noted that when dealing with a two-dimensional array of values, the values may be expressed as a differentiable scalar function of the form:

$$f(x,y). \tag{1}$$

From such a function, the local maxima may be found from the gradient function $$\nabla f(x, y) = \frac{\partial f}{\partial x} i + \frac{\partial f}{\partial y} j. \tag{2}$$

The local maxima occur when $\nabla f(x,y)=0i+0j$.

Accordingly, to determine where a finger, or stylus is touching the touchscreen 25, the firmware may be configured to perform a series of calculations using multiplication (e.g., logical AND function), addition, and subtraction (e.g., two's complement addition) to determine the strongest touch strength values or local maxima according to the above equations. These functions are typically available even in a low cost microcontroller using, for example, MAC 403 of FIG. 4.

Figure 2A:
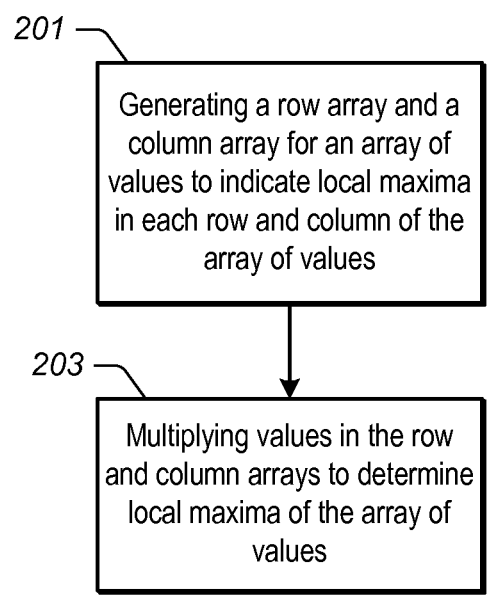
FIG. 2A is a flow diagram describing aspects of one embodiment of a method for finding local maxima of an array.

Referring to FIG. 2A, a flow diagram describing aspects of one embodiment of a method for finding local maxima of an array. Referring collectively to FIG. 2A through FIG. 4 and beginning in block 201, the method begins by generating a row array and a column array from an array of values such as a two-dimensional array, for example, to indicate local maxima in each row and each column of the array. An exemplary two-dimensional array of touch strength values is shown in FIG. 3A, while exemplary row and column arrays are shown in FIG. 3E. In one embodiment, a processor such as the processor 401 of FIG. 5 may execute instructions stored within the memory 405 to create the array of values based upon touch strength values received from, for example, the touch screen 407, and subsequently generate the row and column arrays that identify the local maxima in each row and each column.

The method also includes multiplying together the values in the row and column arrays to determine the local maxima for the array of values. In one embodiment, the multiplier/accumulator (MAC) unit 403 of FIG. 4 may be configured to perform a multiplication operation between each value in the row array and a corresponding value in the column array to determine the local maxima of the two-dimensional array of values. In one embodiment, the local maxima are provided in a maxima array. An exemplary maxima array is also shown in FIG. 3E. These operations are described in greater detail below in conjunction with the descriptions of FIG. 2B.

Figure 2B:
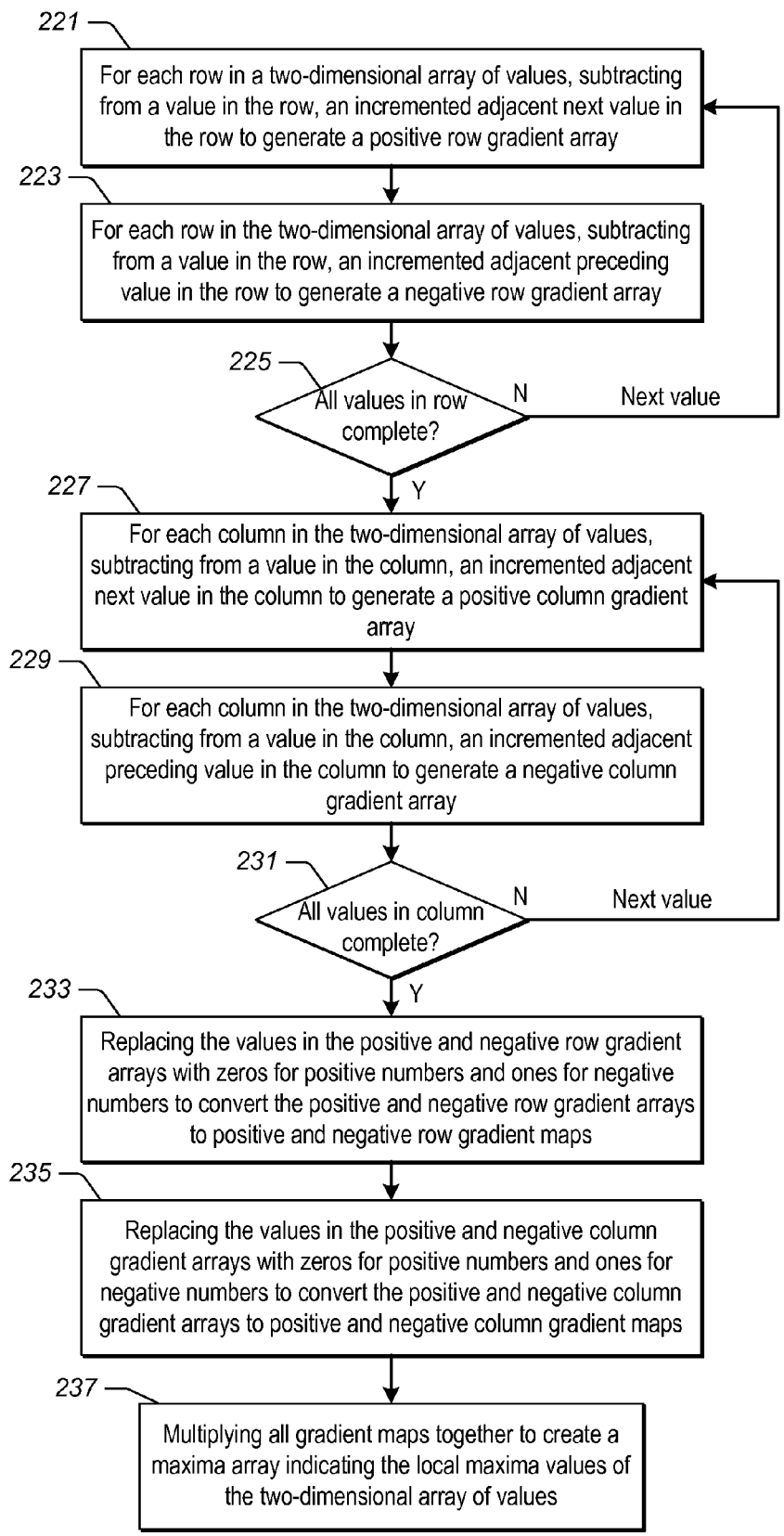
FIG. 2B is a flow diagram describing aspects of another embodiment of a method for finding local maxima of an array.
Figure 3A:
FIG. 3A is a diagram illustrating an exemplary array including values corresponding to strength values from a touchscreen.

Turning to FIG. 2B, a flow diagram describing aspects of another embodiment of a method for finding local maxima of an array is shown. Referring collectively to FIG. 2A through FIG. 4, and beginning in block 221 of FIG. 2B, for each row in a two-dimensional array of values, a positive gradient array and a negative gradient array (block 223 of FIG. 2B) are generated using a subtraction algorithm as shown in Equation 3 and 4, below.

Thus, for a two-dimensional array having n rows and m columns, the positive row gradient array (e.g., XPR) and the row negative gradient array (e.g., XNR) may be found according to Equation 3 and Equation 4, respectively.

$$XPR[1]=-TSI[1], XP[i]=TS[i-1]-TSI[i]; i=2:m \quad (3)$$

$$XNR[m]=-TSI[m], XN[i]=TS[i+1]-TSI[i]; i=1:m-1 \quad (4)$$

As shown above, generating the gradient arrays includes a number of subtraction operations in which values in an incremented version of the array (e.g., TSI) of values are subtracted from values in the array of values. An exemplary incremented touch strength array is shown in FIG. 3A. More particularly, a row in the positive row gradient array is generated by subtracting from each successive value in a given row of the touch strength array, an adjacent next value in a corresponding row of the incremented array. To generate a row in the negative row gradient array an adjacent preceding value in the incremented array is subtracted from each successive value in the touch strength array. This is repeated for each row (block 225 of FIG. 2B).

Similarly, for each column in the two-dimensional array of values, a positive column gradient array (e.g., XPC) and a negative column gradient array (e.g., XNC) may be generated according to Equation 5 and Equation 6, respectively.

$$XPC[1]=-TSI[1], XP[j]=TS[j-1]-TSI[j]; j=2:n \quad (5)$$

$$XNC[n]=-TSI[n], XN[j]=TS[j+1]-TSI[j]; j=1:n-1 \quad (6)$$

Accordingly, a column in the positive row gradient array is generated by subtracting from each successive value in a given column of the touch strength array, an adjacent next value in the corresponding column of the incremented array. To generate a column in the negative row gradient array an adjacent preceding value in the incremented array is subtracted from each successive value in the touch strength array. This is repeated for each column (block 231 of FIG. 2B).

Figure 3B:
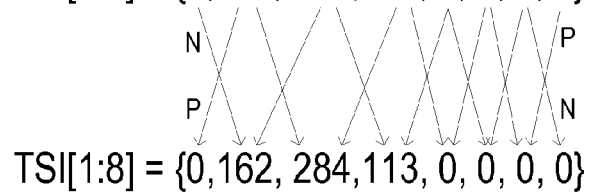
FIG. 3B is a diagram illustrating one embodiment of a manipulation of array values to find a positive and negative gradient array.

As a visual aide in understanding the subtraction algorithm, FIG. 3B illustrates graphically which values are subtracted from which values to generate a positive and a negative gradient row or column. Referring briefly to FIG. 3B, the top row of values represents the first row of the touch strength array of FIG. 3A and is labeled TS[1:8] since there are eight columns numbered one through eight. The bottom row of values represents the first row of the incremented array of FIG. 3A and is labeled TSI[1:8]. As shown, to generate a positive row gradient array using, for example, Equation 3 the $1^{st}$ value in the TSI array is subtracted from the $2^{nd}$ value in TS as shown by the arrow labeled with a 'P'. Thus, the preceding adjacent value in the incremented array is subtracted from a value in the array. This is repeated for each value in the array, and indicated by the corresponding arrows.

Similarly, to generate a negative row gradient array using, for example, Equation 4 the $2^{nd}$ value in the TSI array is subtracted from the $1^{st}$ value in the TS array as shown by the arrow labeled with a 'N'. Thus, the next adjacent value in the incremented array is subtracted from a value in the array. This is repeated for each value in the array, and indicated by the corresponding arrows. This process is repeated for the columns according to Equations 5 and 6 above.

Figure 3C:
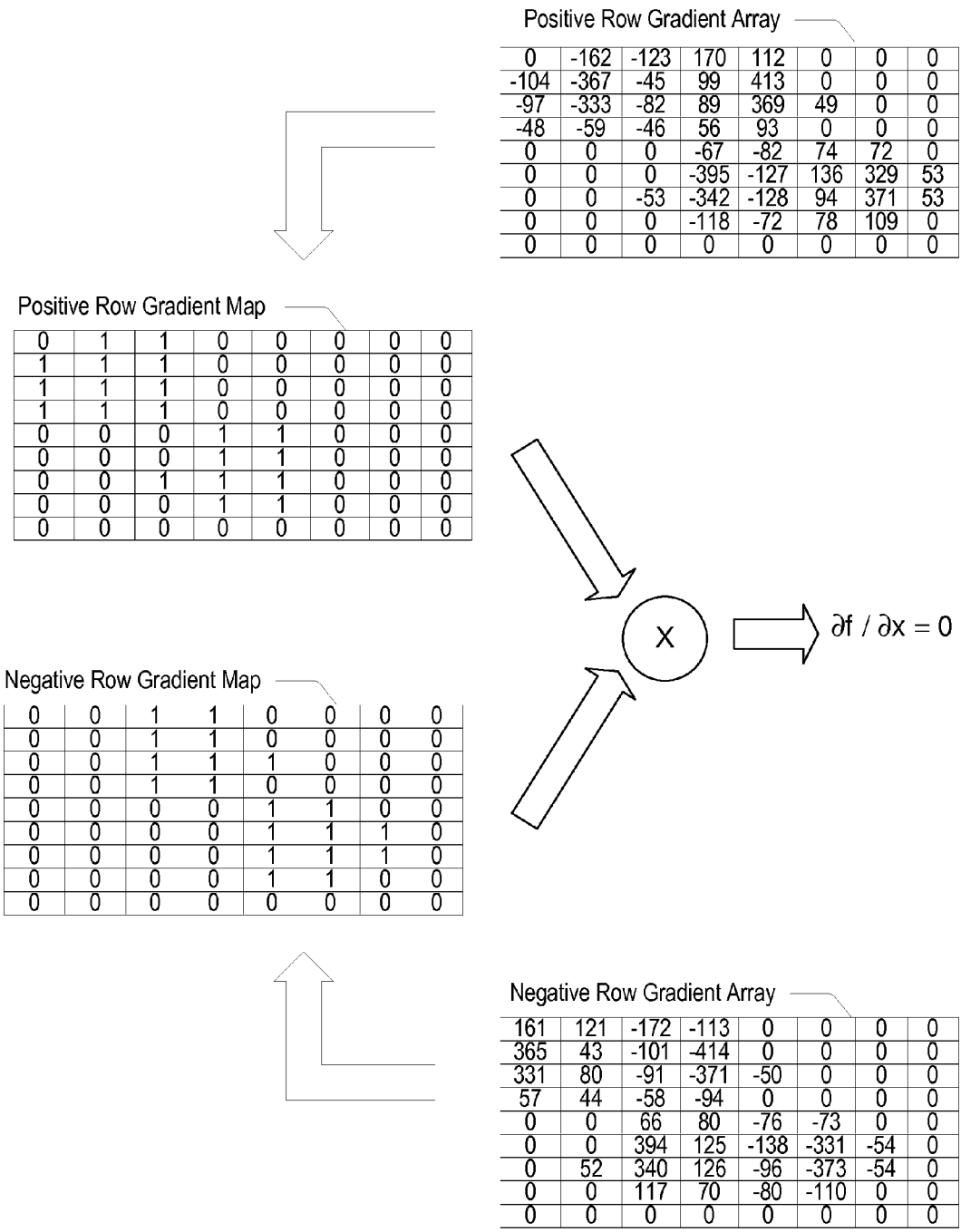
FIG. 3C is a diagram depicting aspects of a transformation of an exemplary array to find local maxima of an array.
Figure 3D:
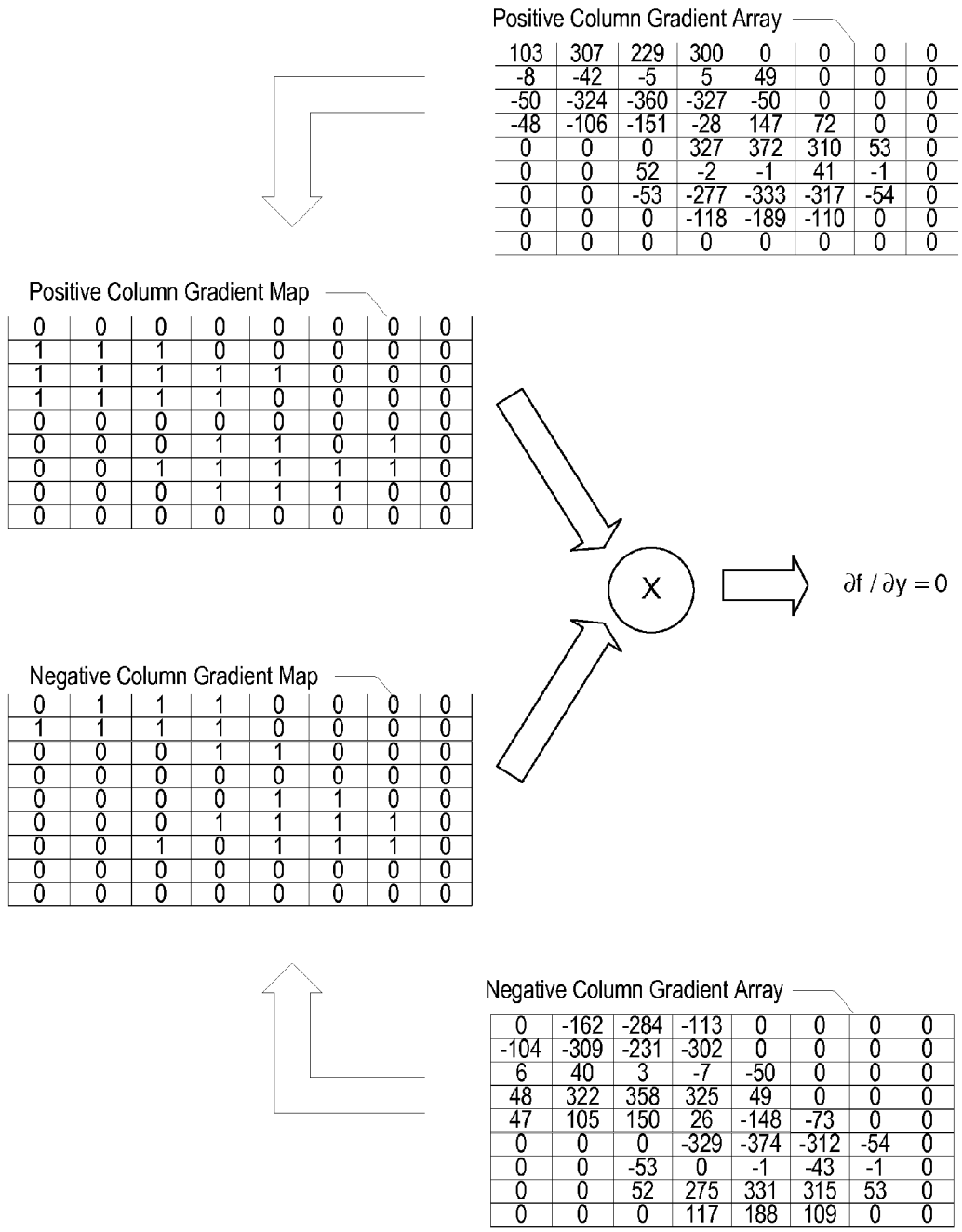
FIG. 3D is a diagram depicting additional aspects of a transformation of an exemplary array to find local maxima of an array.
Figure 3E:
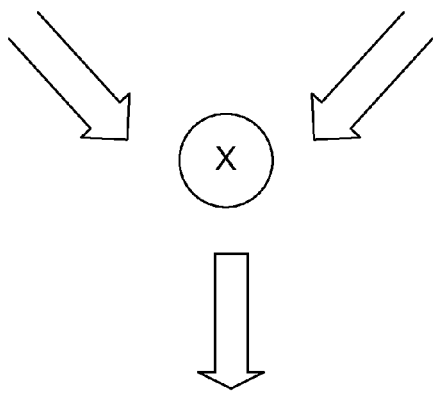
FIG. 3E is a diagram depicting additional aspects of a transformation of an exemplary array to find local maxima of an array.

Once the positive and negative row gradient arrays have been generated, these arrays are converted to positive and negative row gradient maps (block 233 of FIG. 2B). To create the gradient maps, each positive number in the array is replaced with a zero, and each negative number is replaced with a one. Similarly, the same procedure is performed to create positive and negative column gradient maps (block 235 of FIG. 2B). Exemplary gradient arrays and maps for the rows and columns are shown in FIG. 3C and FIG. 3D.

The row gradient maps are then multiplied together to generate a row array, and the column gradient maps are multiplied together to generate a column array. These operations are shown in the examples of FIG. 3C and FIG. 3D, respectively. The row array (shown in FIG. 3E) indicates the local maxima in the rows $$\left(\text{i.e., where } \frac{\partial f}{\partial x}=0\right),$$

while the column array (also shown in FIG. 3E) indicates the local maxima in the columns $$\left(\text{i.e., where } \frac{\partial f}{\partial y}=0\right).$$

To find the intersection of these two (and thus the local maxima of array), the row array and the column array may be multiplied together (block 237 of FIG. 2B). An example of this multiplication operation is illustratively shown in FIG. 3E.

It is noted that using this method, multiple maxima may be identified in the two-dimensional array. In addition, when there are two adjacent maxima values having the same value, the distinct local maxima is identified, and not simply merged. More particularly, by inspection the touch strength array of FIG. 3A includes maxima in the $3^{rd}$ column of the $2^{nd}$ row, and the $5^{th}$ column of the $6^{th}$ and the $7^{th}$ rows. Referring to the maxima array in FIG. 3E, the local maxima are indicated by ones at these locations. Thus, the single local maxima was found at the $3^{rd}$ column of the $2^{nd}$ row, and the dual maxima were found at the $5^{th}$ column of the $6^{th}$ and the $7^{th}$ rows.

In one embodiment, by using the incremented array two or more adjacent array values having the same value and which may otherwise appear as a plateau, may be identified as distinct local maxima.

As shown above, the maxima array may be obtained relatively quickly when compared to conventional comparison methods, and especially when performed on a low-cost processor or microcontroller having a MAC unit such as the system shown in FIG. 4. More particularly, in some embodiments, by using a MAC unit such as the MAC 403 of FIG. 4, the incremented array and the gradient arrays may be computed much faster than the same calculations performed on a processor without a MAC unit. In addition, the various array multiplications may also be more quickly performed by a MAC unit such as the MAC 403 of FIG. 4.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer implemented method, comprising:
generating, for an array of values, a row array for each row in the array and a column array for each column in the array, wherein values in a given generated row array are indicative of local maxima of values in the corresponding row, wherein values in a given generated column array are indicative of local maxima of values in the corresponding column, and wherein the generating is performed by a computer;
multiplying values in the generated row and column arrays to determine local maxima of the array, and wherein the multiplying is performed by the computer.

2. The computer implemented method as recited in claim 1, further comprising generating, for each row in the array, a positive row gradient array and a negative row gradient array, wherein values in the positive row gradient array correspond to a difference between a value in the row and a next value in the row, and wherein values in the negative row gradient array correspond to a difference between a value in the row and a preceding value in the row.

3. The computer implemented method as recited in claim 2, wherein the differences in the positive row gradient array are computed, for a given value in the row, between the given value and an incremented version of the next value in the row, and wherein the differences in the negative row gradient array are computed, for a given value in the row, between the given value and an incremented version of the preceding value in the row.

4. The computer implemented method as recited in claim 2, further comprising replacing, for each value in the positive row gradient array and the negative row gradient array, a positive value with a zero and a negative value with a one to create a positive row gradient map and a negative row gradient map, respectively.

5. The computer implemented method as recited in claim 4, further comprising multiplying each value in the positive row gradient map by a corresponding value in the negative row gradient map to generate the values in the row array.

6. The computer implemented method as recited in claim 1, further comprising generating, for each column in the array, a positive column gradient array and a negative column gradient array, wherein values in the positive column gradient array correspond to a difference between a value in the column and a next value in the column, and wherein values in the negative column gradient array correspond to a difference between a value in the column and a preceding value in the column.

7. The computer implemented method as recited in claim 6, wherein the differences in the positive column gradient array are computed, for a given value in the column, between the given value and an incremented version of the next value in the column, and wherein the differences in the negative column gradient array are computed, for a given value in the column, between the given value and an incremented version of the preceding value in the column.

8. The computer implemented method as recited in claim 6, further comprising replacing, for each value in the positive column gradient array and the negative column gradient array, a positive value with a zero and a negative value with a one to create a positive column gradient map and a negative column gradient map, respectively.

9. The computer implemented method as recited in claim 1, further comprising generating a maxima array including results of the multiplying, wherein each value in the maxima array corresponds to a respective value in the array of values and indicates whether the respective value corresponds to a local maximum of the array.

10. An apparatus comprising:
a memory configured to store an array of values;
a processor coupled to the memory, wherein the processor includes a multiplier accumulator unit configured to operate on the values stored in the storage;
wherein the multiplier accumulator unit is configured to generate a row array for each row in the array and a column array for each column in the array, wherein values in a generated row array are indicative of local maxima of values in the corresponding row, wherein values in a generated column array are indicative of local maxima of values in the corresponding column;
wherein the multiplier accumulator unit is configured to multiply values in the generated row and column arrays to determine local maxima of the array.

11. The apparatus as recited in claim 10, further comprising a touch screen device coupled to the processor, wherein each of the values of the array of values correspond to touch strength values associated with the touch screen device.

12. The apparatus as recited in claim 10, wherein the processor is configured to generate, for each row in the array, a positive row gradient array and a negative row gradient array, wherein the multiplier accumulator is configured to successively subtract from a value in the row a next value in the row to create each value in the positive row gradient array, and to successively subtract from a value in the row a preceding value in the row to create each value in the negative row gradient array.

13. The apparatus as recited in claim 12, wherein each next value in a given row is an incremented version of the next value in the given row, and wherein each preceding value in a given row is an incremented version of the preceding value in the given row, wherein the incremented versions are subtracted for identifying adjacent local maxima that appear as plateaus.

14. The apparatus as recited in claim 12, wherein the processor is further configured to replace, for each value in the positive row gradient array and each value in the negative row gradient array, a positive value with a zero and a negative value with a one to create a positive row gradient map and a negative row gradient map, respectively.

15. The apparatus as recited in claim 14, wherein the multiplier accumulator unit is configured to multiply each value in the positive row gradient map by a corresponding value in the negative row gradient map to generate the values in the row array.

16. The apparatus as recited in claim 10, wherein the processor is configured to generate, for each column in the array, a positive column gradient array and a negative column gradient array, wherein the multiplier accumulator is configured to successively subtract from a value in the column a next value in the column to create each value in the positive column gradient array, and to successively subtract from a value in the column a preceding value in the column to create the negative column gradient array.

17. The apparatus as recited in claim 16, wherein the processor is configured to replace, for each value in the positive column gradient array and the negative column gradient array, a positive value with a zero and a negative value with a one to create a positive column gradient map and a negative column gradient map, respectively.

18. The apparatus as recited in claim 17, wherein the multiplier accumulator unit is configured to multiply each value in the positive column gradient map by a corresponding value in the negative column gradient map to generate the values in the column array.

19. A method comprising:
   determining, using a computer, a positive row gradient array and a negative row gradient array for values in each row in a two-dimensional array of values based upon a difference between the values in each row and an incremented version of the values in the two-dimensional array of values;
   generating, using a computer, a row array for each row in the two-dimensional array of values based upon the positive gradient array and the negative gradient array, wherein values in a given row array are indicative of local maxima of values in the corresponding row;
   determining, using a computer, a positive column gradient array and a negative column gradient array for values in each column in the two-dimensional array of values based upon a difference between the values in each column and an incremented version of the values in the two-dimensional array of values;
   generating, using a computer, a column array for each column in the two-dimensional array of values, wherein values in a given column array are indicative of local maxima of values in the corresponding column;
   wherein the row array and the column array are used to determine local maxima in the two-dimensional array of values, wherein a local maximum corresponds to a value in which a gradient function is equal to zero in both dimensions of the two-dimensional array of values.

20. The method as recited in claim 19, further comprising:
   successively subtracting from a value in a given row a next value in the given row to create each value in the positive row gradient array;
   successively subtracting from a value in the given row a preceding value in the given row to create each value in the negative row gradient array;
   successively subtracting from a value in a given column a next value in the given column to create each value in the positive column gradient array; and
   successively subtracting from a value in the given column a preceding value in the given column to create the negative column gradient array.

* * * * *